United States Patent [19]

Togawa et al.

[11] Patent Number: 4,465,735
[45] Date of Patent: Aug. 14, 1984

[54] MAGNETIC RECORDING MEDIUM

[75] Inventors: Fumio Togawa, Ohtsu; Shigeo Aoyama, Ibaraki, both of Japan

[73] Assignee: Hitachi Maxell, Ltd., Osaka, Japan

[21] Appl. No.: 422,464

[22] Filed: Sep. 23, 1982

[30] Foreign Application Priority Data

Sep. 24, 1981 [JP] Japan ................................ 56-151470

[51] Int. Cl.³ ............................................ H01F 10/02
[52] U.S. Cl. .................................... 428/329; 428/339; 428/403; 428/457; 428/694; 428/900
[58] Field of Search ................................ 427/127–132, 427/48; 252/62.54; 428/900, 694, 425.9, 329, 332, 403

[56]         References Cited
          U.S. PATENT DOCUMENTS 4,125,474 11/1978 Dezawa et al. ................... 252/62.62
4,237,506 12/1980 Manly ................................. 360/135
4,302,523 11/1981 Audran et al. ...................... 428/328
4,303,699 12/1981 Tamura .......................... 427/128 X
4,315,052  2/1982 Takahashi et al. .................. 428/328
4,337,288  6/1982 Takenaka et al. ................... 428/328

Primary Examiner—Bernard D. Pianalto
Attorney, Agent, or Firm—Birch, Stewart, Kolasch & Birch

[57]                ABSTRACT

An improved magnetic recording medium suitable for high density recording is disclosed, which has a squareness ratio in the vertical direction of 0.6 or more and an orientation ratio (squareness ratio in the vertical direction/squareness ratio in the lengthwise direction) of 0.7 or more, prepared from acicular magnetic iron oxide particles having crystalline magnetic anisotropy and a ratio of $Fe^{2+}/Fe^{3+}$ of 0.05 or less uniformly cobalt-doped, the particles having preferably a particle size of $0.3\mu$ or less and an axial ratio of 6 to 10.

3 Claims, No Drawings

MAGNETIC RECORDING MEDIUM

The present invention relates to an improved magnetic recording medium, particularly to a magnetic recording medium suitable for a high density recording, and a method for the production thereof. More particularly, it relates to a magnetic recording medium prepared from acicular magnetic cobalt-doped iron oxide particles having a ratio of $Fe^{2+}/Fe^{3+}$ of 0.05 or less and further having crystalline magnetic anisotropy and uniform shape, and to a method for the production thereof.

There has hitherto been known a magnetic recording medium such as a magnetic tape wherein the magnetic characteristics thereof are improved by orientating the acicular magnetic particles present in the magnetic layer in lengthwise direction of the magnetic tape. However, such a magnetic recording medium wherein the acicular magnetic particles are oriented in the lengthwise direction is deficient in high density recording. That is, by utilizing the magnetization in a lengthwise direction, when the recording density of the signal is increased, the diamagnetic field within the magnetic recording medium is also increased, which results in deterioration of residual magnetization and hence in difficulty of detection of the recording signal.

Conventional magnetic iron-cobalt oxide particles usable for the preparation of a magnetic recording medium are usually prepared by dissolving an iron compound and a cobalt compound in water, adding thereto an alkali to produce iron-cobalt coprecipitates, oxidizing them to produce cobalt-containing goethite particles, dehydrating the geothite particles by heating in air to convert them into α-hematite particles, reducing them by heating in a hydrogen gas stream and then oxidizing to obtain magnetic cobalt-doped iron oxide particles. According to this known method, however, different atoms of cobalt and iron are coprecipitated in the form of a compound thereof during the step for producing goethite particles, and hence, it is difficult to obtain goethite particles having suitable particle size and axial ratio, and the magnetic cobalt-doped iron oxide particles which are prepared by reducing and oxidizing the cobalt-containing goethite particles do not have a uniform distribution of particle shapes, and therefore are not suitable as a material for a magnetic recording medium usable for high density recording.

It has been determined that the desired magnetic particles may be obtained by dispersing magnetic iron oxide particles in an aqueous solution containing cobalt ions and then forming a layer of iron oxide containing cobalt on the surface of the iron oxide particles, but even by this method, when the magnetic particles contain a large amount of ferrous ions, the desired magnetic cobalt-doped iron oxide particles having complete crystalline magnetic anisotropy are difficult to obtain, and the magnetic components positioned in a vertical direction to the magnetic recording medium prepared from such particles are not sufficient to yield high output at a short wavelength. As a result of further intensive study, it has now been found that when iron oxide particles having a ratio of ferrous ion to ferric ion (i.e. $Fe^{2+}/Fe^{3+}$) of 0.05 or less are used and are uniformly doped with cobalt within the particles, there are obtained acicular magnetic cobalt-doped iron oxide particles having crystalline magnetic anisotropy and uniform shape, and when such acicular magnetic cobalt-doped iron oxide particles are used as a magnetic paint composition, there can be obtained the desired magnetic recording medium having a squareness ratio in the vertical direction of the magnetic layer of 0.6 or more and an orientation ratio (squareness ratio in vertical direction/squareness ratio in lengthwise direction) of 0.7 or more which maintain sufficient vertical magnetic components in the magnetic layer and hence sufficiently improved recording characteristics at a high density range and can sufficiently be used for recording at a short wavelength such as 1μ or less as well as at a long wavelength.

An object of the present invention is to provide an improved magnetic recording medium suitable particularly for a high density recording. Another object of the invention is to provide an improved method for the preparation of the desired magnetic recording medium suitable for producing a high density recording. A further object of the invention is to provide magnetic cobalt-doped iron oxide particles suitable for the preparation of the magnetic recording medium, which magnetic particles are acicular having crystalline magnetic anisotropy and a ratio of $Fe^{2+}/Fe^{3+}$ of 0.05 or less wherein cobalt is uniformly doped. These and other objects and advantages of the invention will be apparent to persons skilled in the art from the following description.

The improved magnetic recording medium of the present invention can be prepared by using specific magnetic cobalt-containing iron oxide particles.

The magnetic cobalt-containing iron oxide particles used for the preparation of the magnetic recording medium of the present invention are acicular magnetic iron oxide particles having crystalline magnetic anisotropy, uniform shapes and a ratio of $Fe^{2+}/Fe^{3+}$ of 0.05 or less, which particles are uniformly doped with cobalt.

Such preferred magnetic particles can be prepared by dispersing seeds of magnetic iron oxide particles in an aqueous solution containing cobalt ions (preferably in an amount of 0.01 to 0.5 mole/liter); adding thereto an alkali (e.g. sodium hydroxide, potassium hydroxide) to form a layer of iron oxide containing cobalt on the seeds; separating by filtration; washing with water and drying the particles thus formed; heating the particles in a non-oxidizing atmosphere (e.g. under nitrogen gas) at a temperature of 300° C. or higher; and then oxidizing the particles by heating at a temperature of 200° C. or higher in an oxidizing atmosphere (e.g. in air), by which the cobalt ion is uniformly diffused within so as to dope the iron oxide particles. When the iron oxide particles having a layer of a cobalt-containing iron oxide on the seeds thereof are heat-treated at a temperature of 300° C. or higher in a non-oxidizing atmosphere, followed by oxidizing at a temperature of 200° C. or higher in an oxidizing atmosphere, there can be obtained the magnetic particles having the desired $Fe^{2+}/Fe^{3+}$ ratio. When magnetic particles having an $Fe^{2+}/Fe^{3+}$ ratio of more than 0.05 are used and are doped with cobalt, the magnetic particles having the desired crystalline magnetic anisotropy cannot be obtained, and the product has insufficient magnetic components in the vertical direction.

According to the method of the present invention, after forming a layer of a cobalt-containing iron oxide on the surface of the seed magnetic iron oxide particles, the particles are put in a non-oxidizing atmosphere in order to prevent decrease of ferrous ion ($Fe^{2+}$) which is present within the particles and is easily exchanged with cobalt ion, and then the particles are heated at a temperature of 300° C. or higher in order to substitute the ferrous ion with the cobalt ion. The resulting particles wherein cobalt ion is sufficiently and uniformly diffused and substituted are then heated at a temperature of 200° C. or higher in an oxidizing atmosphere, by which the excess ferrous ion is completely changed to ferric ion and the uniformly diffused and substituted cobalt ion is fixed within the particles to give particles having $Fe^{2+}/Fe^{3+}$ of 0.05 or less.

According to the method of the present invention, the particle shape, axial ratio, particle size, etc. of the produced magnetic particles are almost the same as those of the starting magnetic iron oxide particles dispersed in the aqueous solution, and hence, the desired uniform magnetic particles can easily be obtained by selecting appropriate magnetic iron oxide particles having the desired shape, axial ratio, particle size, etc. as the starting magnetic particles.

The starting magnetic iron oxide particles are preferably acicular particles having a particle size of $0.3\mu$ or less and an axial ratio of 3 to 15, and particularly particles having uniform particle size and axial ratio. Specifically preferred magnetic particles have such a particle distribution such that 70% or more of whole magnetic particles are in the range of ±20% of average values in particle size and axial ratio. Such uniform magnetic particles can readily be prepared by a known method as is disclosed in, for example, Yoshio Yada et al, "A new high Hc $\gamma$-ferric oxide exhibiting coercive force as high as 450–470 oersteds", IEEE Trans. Magn., Mag-9, pp 185–188, 1973, and Brian Gusturd et al, "A new $\gamma$-$Fe_2O_3$ particle exhibiting improved orientation", IEEE Trans. Magn., Mag-8, pp 426–427, 1972.

The cobalt content of the magnetic iron oxide particles is preferably in the range of 3 to 15% by weight based on the total weight of the magnetic particles. Besides, the acicular magnetic cobalt-doped iron oxide particles with crystalline magnetic anisotropy have preferably a particle size of $0.3\mu$ or less, because when the particle size is larger than $0.3\mu$, the magnetic tape prepared from the particles does not have a smooth surface which is required to show higher output at a short wavelength.

The magnetic recording medium, e.g. magnetic tape, of the present invention is prepared by applying the acicular magnetic cobalt-doped iron oxide particles having crystalline magnetic anisotropy and $Fe^{2+}/Fe^{3+}$ of 0.05 or less on a base film together with a binder and other conventional additives (e.g. organic solvents) for example by a gravure coating method and then drying. The resulting magnetic recording medium has preferably a squareness ratio in the vertical direction in the magentic layer of 0.6 or more and an orientation ratio (squareness ratio in vertical direction/squareness ratio in lengthwise direction) of 0.7 or more. When the squareness ratio in the vertical direction is less than 0.6 and the orientation ratio is less than 0.7, the magnetic recording medium shows insufficient output level at a short wavelength such as $1\mu$ or less.

The magnetic recording medium having a squareness ratio in the vertical direction of 0.6 or more and an orientation ratio of 0.7 or more shows sufficient vertical remanent magnetization and can sufficiently be used for recording at a short wavelength, such as $1\mu$ or less, as well as at a long wavelength. Besides, because the magnetic particles have an acicular shape, the magnetic recording medium will show less a decrease of magnetization by heating.

The binder used for the preparation of a magnetic recording medium includes all conventional binder resins, such as vinyl chloride-vinyl acetate copolymer, polyvinylbutyral, polyurethane resins, nitrocellulose, or the like. The organic solvent used includes all conventional organic solvents, such as toluene, methyl isobutyl ketone, methyl ethyl ketone, cyclohexanone, tetrahydrofuran, ethyl acetate, or the like, which may be used alone or in combination of two or more thereof.

For the preparation of a magentic recording medium, the magnetic cobalt-doped iron oxide particles are used in the form of a magentic paint composition which is prepared by mixing the magnetic particles with a binder resin and an organic solvent and further optionally other conventional additives, such as dispersing agents, lubricating agents, polishing agents, antistatic agents, or the like.

The present invention is illustrated by the following Examples but should not be considered to be limited thereto.

EXAMPLE 1

$\gamma$-$Fe_2O_3$ particles (average particles size: $0.3\mu$ (80% or more: $0.25$–$0.35\mu$), average axial ratio: 8 (80% or more: 7–9), 1,000 g) are dispersed in an aqueous solution (5 liters) containing cobalt sulfate ($CoSO_4.7H_2O$) (1.2 mole) and ferrous sulfate ($FeSO_4.7H_2O$) (3.6 mole), and thereto is added an aqueous solution (5 liters) of sodium hydroxide (28.8 mole). The mixture is heated to 45° C. and is stirred for 6 hours with keeping this temperature. After the reaction, the resulting magnetic particles are washed well with water and dried. The particles are heated under nitrogen gas at 450° C. for 2 hours and then oxidized in air at 300° C. for one hour to give magnetic cobalt-doped iron oxide particles.

The magnetic cobalt-doped iron oxide particles thus obtained are acicular magnetic particles which have $Fe^{2+}/Fe^{3+}$: 0.005, cobalt content: 5% by weight, coercive force (Hc): 850 oersteds, maximum magnetization ($\sigma S$): 72 emu/g, and squareness ratio ($\sigma r/\sigma s$): 0.72. When the particles were observed by an electron microscope ($\times 10^5$), about 70% of the whole particles had a particle size of $0.25$–$0.35\mu$ and about 80% of the whole particles had an axial ratio of 6–10.

By using the magnetic cobalt-doped iron oxide particles, a magnetic paint composition is prepared in the following formulation, wherein the ingredients are mixed well with a ball mill for 3 days.

| Ingredients | Amount |
| --- | --- |
| Co-doped $\gamma$-$Fe_2O_3$ particles | 750 parts by weight |
| VAGH (vinyl chloride-vinyl acetate-vinyl alcohol copolymer, manufactured by U.C.C. in U.S.A.) | 125 parts by weight |
| Pandex T-5250 (urethane elastomer, manufactured by Dainippon Ink Co.) | 100 parts by weight |
| Colonate L (trifunctional low molecular weight isocyanate compound, manufactured by Nippon Polyurethane Kogyo, K.K.) | 25 parts by weight |
| n-Butyl stearate | 15 parts by weight |
| Methyl isobutyl ketone | 600 parts by weight |
| Toluene | 600 parts by weight |

The magnetic paint composition thus obtained is applied onto a polyester base film (thickness: $12\mu$) and then is dried to form a magnetic layer (thickness; $3\mu$ in dry state). After calendering the magnetic layer to obtain smooth surface, the coated film is cut in a prescribed width to give a magnetic tape.

EXAMPLE 2

In the same manner as described in Example 1 except that the amounts of cobalt sulfate, ferrous sulfate and sodium hydroxide are changed to 0.9 mole, 2.7 mole and 21.6 mole, respectively, there are obtained magnetic cobalt-doped iron oxide particles which are acicular magnetic particles having particle size (long axia): 0.3μ, axial ratio (long axis/short axis): 8, $Fe^{2+}/Fe^{3+}$: 0.002, cobalt content: 4% by weight, coercive force (Hc): 720 oersteds, maximum magnetization ($\sigma s$): 72 emu/g, and squareness ratio ($\sigma r/\sigma s$): 0.72.

By using the magnetic cobalt-containing iron oxide particles thus obtained, a magnetic tape is prepared in the same manner as described in Example 1.

EXAMPLE 3

In the same manner as described in Example 1 except that the amounts of cobalt sulfate, ferrous sulfate and sodium hydroxide are changed to 1.5 mole, 4.5 mole and 36 mole, respectively, there are obtained magnetic cobalt-doped iron oxide particles which are acicular magnetic particles having particle size (long axis): 0.3μ, axial ratio (long axis/short/axis): 8, $Fe^{2+}/Fe^{3+}$: 0.005, cobalt content: 6% by weight, coercive force (Hc): 920 oersteds, maximum magnetization ($\sigma s$): 73 emu/g, and squareness ratio ($\sigma r/\sigma s$): 0.73.

By using the magnetic cobalt-doped iron oxide particles thus obtained, a magnetic tape is prepared in the same manner as described in Example 1.

EXAMPLE 4

In the same manner as described in Example 1 except $\gamma$-$Fe_2O_3$ particles (particle size: 0.2μ, axial ratio: 3) are used as the starting material, there are obtained magnetic cobalt-doped iron oxide particles which are acicular magnetic particles having particle size (long axis): 0.2μ, axial ratio (long axis/short axis): 3, $Fe^{2+}/Fe^{3+}$: 0.002, cobalt content: 5% by weight, coercive force (Hc): 830 oersteds, maximum magnetization ($\sigma s$): 70 emu/g, and squareness ratio ($\sigma r/\sigma s$): 0.71.

By using the magnetic cobalt-doped iron oxide particles thus obtained, a magnetic tape is prepared in the same manner as described in Example 1.

REFERENCE EXAMPLE 1

The same $\gamma$-$Fe_2O_3$ particles (1,000 g) as used in Example 1 are dispersed in an aqueous solution (2 liters) containing cobalt chloride (0.7 mole), and thereto is added an aqueous solution (2 liters) containing complexing agents (i.e. sodium citrate: 0.3 mole, and sodium tartrate: 0.15 mole), and the mixture is heated at 200° C. for 3 hours in an autoclave. After the hydrothermal reaction, the produced cobalt-containing iron oxide particles are separated by filtration, washed with water and then dried to give magnetic cobalt-doped iron oxide particles having particle size (long axis): 0.4μ, axial ratio (long axis/short axis): 8, $Fe^{2+}/Fe^{3+}$: 0.09, cobalt content: 4% by weight, maximum magnetization ($\sigma s$): 74 emu/g, and squareness ratio ($\sigma r/\sigma s$): 0.6.

By using the same formulation as in Example 1 except that the magnetic cobalt-doped iron oxide particles obtained above are used instead of the Co-doped $\gamma$-$Fe_2O_3$ particles obtained in Example 1, a magnetic tape is prepared, likewise.

REFERENCE EXAMPLE 2

A solution of ferrous sulfate ($FeSO_4.7H_2O$) (220 g) in water (2 liters) is mixed with a solution of cobalt sulface ($CoSO_4.7H_2O$) (15 g) in water (1 liter) in a 10 liter vessel. To the mixture is added a 12.5% aqueous sodium hydroxide (4 liters) to give a suspension containing coprecipitated Fe-Co compounds. While keeping the suspension at 40° C., air is introduced into the suspension at a rate of 10 liters/hour for 8 hours, by which procedure the coprecipitated compounds are oxidized to give cobalt-containing goethite particles. The goethite particles are filtered, washed with water and then dried. The dried goethite particles are dehydrated by heating in air at 300° C. for 1 hour to convert them into cobalt-containing α-hematite particles, which are reduced by heating under hydrogen stream at 320° C. for 2 hours to give cobalt-containing magnetite particles. The particles are oxidized by heating in air at 250° C. for 1 hour to give magnetic cobalt-doped iron oxide particles which have $Fe^{2+}/Fe^{3+}$: 0.002, cobalt content: 5.2% by weight, coercive force: 810 oersteds, maximum magnetization: 70 emu/g, and squareness ratio ($\sigma r/\sigma s$): 0.70. When the particles were observed by an electron microscope ($\times 10^5$), about 50% of the particles had a particle size of 0.1 to 0.4μ and about 50% of the particles had an axial ratio of 6 to 15.

By using the same formulation as in Example 1 except that the magnetic cobalt-doped iron oxide particles obtained above are used instead of the Co-doped $\gamma$-$Fe_2O_3$ particles obtained in Example 1, a magnetic tape is prepared, likewise.

As to the magnetic tapes prepared in the above Examples and Reference Examples, there were measured the coercive force (Hc), remanent magnetic flux density (Br), maximum magnetic flux density (Bs) and squareness ratio (Br/Bs) in lengthwise direction, and further the coercive force (Hc), remanent magnetic flux density (Br) and squareness ratio (Br/Bs) in vertical direction, and then, the orientation ratio (squareness ratio in vertical direction/squareness ratio in lengthwise direction) was determined. Besides, the maximum output level (M.O.L.) at various recording wavelengths was also measured.

The results are shown in the following table.

|  |  | Ex. 1 | Ex. 2 | Ex. 3 | Ex. 4 | Ref. Ex. 1 | Ref. Ex. 2 |
|---|---|---|---|---|---|---|---|
| Lengthwise | Coercive force Hc (Oe) | 880 | 750 | 950 | 850 | 800 | 830 |
| direction | Remanent magnetic flux density Br (G) | 1333 | 1324 | 1388 | 1292 | 1373 | 1270 |
| (x) | Maximum magnetic flux density Bs (G) | 1710 | 1720 | 1780 | 1700 | 1769 | 1650 |
|  | Squareness ratio Br/Bs | 0.78 | 0.77 | 0.78 | 0.76 | 0.78 | 0.77 |
| Vertical | Coercive force Hc (Oe) | 810 | 690 | 880 | 790 | 580 | 750 |
| direction | Remanent magnetic flux density Br (G) | 1265 | 1256 | 1317 | 1241 | 760.7 | 1190 |
| (z) | Squareness ratio Br/Bs | 0.74 | 0.73 | 0.74 | 0.73 | 0.43 | 0.72 |
| Orientation ratio z/x |  | 0.95 | 0.95 | 0.95 | 0.96 | 0.55 | 0.94 |
| Maximum | 5μ wavelength | +0.5 | +0.6 | +0.5 | 0 | 0 | +0.4 |
| output | 1μ wavelength | +3.0 | +2.0 | +4.1 | +3.0 | 0 | +2.0 |

|  |  | Ex. 1 | Ex. 2 | Ex. 3 | Ex. 4 | Ref. Ex. 1 | Ref. Ex. 2 |
| --- | --- | --- | --- | --- | --- | --- | --- |
| level | 0.75μ wavelength | +5.3 | +4.1 | +6.3 | +5.3 | 0 | +3.2 |
| M.O.L. (dB) | 0.5μ wavelength | +7.2 | +5.8 | +8.0 | +6.9 | 0 | +3.6 |

As is clear from the above table, the magnetic tapes of the present invention (Example 1 to 4) show larger coercive force, remanent magnetic flux density and squareness ratio in lengthwise direction, larger orientation ratio and further larger maximum output level not only at a long wavelength but also at a short wavelength, particularly at such a short wavelength as 1μ or less, in comparison with those of the conventional magnetic tapes (Reference Examples 1 and 2). In comparison with the product of Reference Example 2, the magnetic tapes of the present invention show larger maximum output level at such a short wavelength as 1μ or less, the reason of which may be due to the facts that the magnetic particles obtained in Reference Example 2 have more spreaded distribution in terms of particle shape, axial ratio and particle size in comparison with the particles obtained in Examples 1 to 4 and hence have lower recording characteristics at a short wavelength. From these experimental results, it is clear that the magnetic recording medium of the present invention has excellent recording characteristics at a long wavelength and further is particularly excellent in the high density recording.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium comprising a magnetic layer superimposed on a support base, said magnetic layer comprising uniform acicular magnetic uniformly cobalt-doped iron oxide particles having crystalline magnetic anisotropy and a ratio of $Fe^{2+}/Fe^{3+}$ of 0.05 or less in said cobalt-doped iron oxide particles, a squareness ratio in the vertical direction of 0.6 or more and an orientation ratio (squareness ratio in the vertical direction/squareness ratio in the lengthwise direction) of 0.7 or more so as to maintain sufficient vertical magnetic components in said magnetic layer.

2. A magnetic recording medium according to claim 1, wherein said magnetic iron oxide particles have an average particle size of 0.3μ or less.

3. A magnetic recording medium according to claim 1, wherein said magnetic particles have a content of cobalt in the range of 3 to 15% by weight based on the total weight of said magnetic particles.

* * * * *